United States Patent Office 2,917,548
Patented Dec. 15, 1959

2,917,548
CHEMICAL COMPOUNDS AND PROCESS FOR THEIR PREPARATION

Stanley Dixon, Wilmington, Del., assignor to E. I. du Pont de Nemours and Company, Wilmington, Del., a corporation of Delaware No Drawing. Application February 28, 1957
Serial No. 642,942

7 Claims. (Cl. 260—614)

This invention is directed to novel alkyl and alkenyl trifluorovinyl ethers and a process for their manufacture. Specifically, the present invention is directed to vinyl ethers having the structure R—O—CF=CF$_2$ where R is an alkyl, fluoroalkyl, or alkenyl group in which the carbon atom attached to the oxygen has at least two hydrogens attached to said carbon atom, and, the process for preparing said ethers by reacting tetrafluoroethylene with an alkali metal alcoholate (R—O—M) in an inert solvent. These trifluorovinyl ethers are useful in that they can be converted into high molecular weight polymers for use in injection molding and melt extrusion fabrication techniques; they can be converted into dimers of high thermal stability for use as heat stable fluids.

The well-known preparation for mixed ethers utilizing the interaction of an alkyl halide and sodium alkoxide has not been applicable to the direct preparation of vinyl ethers in general because of the chemical inertness of halides attached to vinyl chains:

R—O—Na + R'—X ⟶ R—O—R' + NaX

Attempts have been made by two-step processes, (a) preparation of a saturated halogen-containing mixed ether followed by (b) dehydrohalogenation, to get around this obstacle. An example of the two-step approach is to be found in Corley et al., Abstracts of Papers, 124th Meeting ACS, Sept., 1953, p. 29M:

CF$_2$=CFCl + R—OH $\xrightarrow{\text{base}}$ R—O—CF$_2$—CFClH

R—O—CF$_2$—CFClH + KOH ⟶ R—O—CF=CFCl

However, Ruh in U.S. 2,737,530 of March 6, 1956, now teaches that a substituted-vinyl chloride can be converted to a vinyl ether in a one-step process:

ROH + Na + CFCl=CFCl ⟶ R—O—CF=CFCl + NaCl
(or KOH)      (or KCl)

Ruh definitely excludes the fluorine atom in the vinyl halide from taking part in the reaction. By combining the teaching of Ruh with the teaching of Park et al., J. Am. Chem. Soc., 70, 1550 (1948), namely that fluoro-olefins react with alcohols and base to form the saturated ether, ROH + CF$_2$=CFCl $\xrightarrow{\text{base}}$ R—O—CF$_2$—CFClH one skilled in the art would conclude that the extremely inert fluorine atom of fluoro-olefins could not be eliminated for direct conversion of a fluoro-olefin to an unsaturated ether. Furthermore, the saturated ether derived from tetrafluoroethylene in a manner analogous to Parks cannot be dehydrofluorinated so the two-step process is unavailable for producing trifluorovinyl ethers:

ROH + CF$_2$=CF$_2$ $\xrightarrow{\text{base}}$ R—O—CF$_2$—CF$_2$H

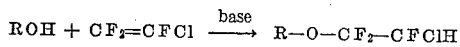

It is an object of this invention to provide a novel one-step process for the manufacture of alkyl, fluoroalkyl, and alkenyl trifluorovinyl ethers. It is a further object to provide novel alkyl, fluoroalkyl, and alkenyl trifluorovinyl ethers which are monomers capable of being converted to useful polymers.

More specifically, the present invention is directed to:

(1) A process for the preparation of trifluorovinyl ethers having the structure R—O—CF=CF$_2$ where R is alkyl, fluoro-substituted alkyl, or alkenyl in which the carbon atom attached to the oxygen has at least two hydrogens attached to said carbon atom, said carbon atom and two hydrogens constituting a —CH$_2$— group, which process consists of reacting, in an inert solvent, a fluoro-olefin, tetrafluoroethylene, with an alkali metal alcoholate derived from alcohols of the structure ROH, wherein R is alkyl, fluoro-substituted alkyl, or alkenyl as described above, followed by eliminating the alkali metal fluoride.

(2) Compounds of the structure R—O—CF=CF$_2$ wherein R is an alkyl, fluoro-substituted alkyl, or an alkenyl radical in which the carbon atom attached to the oxygen has at least two hydrogens attached to said carbon atom, said carbon atom and two hydrogens constituting a —CH$_2$— group.

The trifluorovinyl ethers of the present invention are prepared by the reaction of the alkali metal alcoholate of the alcohol corresponding to the —OR group in the ether with tetrafluoroethylene. The reaction may be illustrated by the following equation:

R—O—Na + CF$_2$=CF$_2$ → R—O—CF=CF$_2$ + NaF

The alkali metal alcoholate may be available commercially as, for example, sodium methoxide. It is not necessary that the alkali metal alcoholate be isolated. For example, the reaction may be carried out by reacting the alcohol with a sodium dispersion in an organic solvent and then adding tetrafluoroethylene to the resulting reaction mixture. However, great care should be taken that no hydroxyl hydrogen or other available hydrogen remains in the reaction system (e.g., no free alcohol) when the tetrafluoroethylene is added; otherwise, the saturated ether, R—O—CF$_2$—CF$_2$H, is formed. The reaction is carried out in a pressure vessel such as a stainless steel bomb and continued until the pressure is constant thus indicating no further reaction of the gas, tetrafluoroethylene. Alternately, the bomb may be repressured with tetrafluoroethylene to maintain a given pressure and the reaction is carried out until no further decrease in pressure occurs. The bomb is then agitated and heated at about 80° C. to 110° C. After completion of the reaction, the bomb is cooled and the mixture may be treated in alternate ways: (a) the mixture may be neutralized with an aqueous inorganic acid and then the inert non-aqueous solvent layer may be separated and distilled; or (b) the mixture may be treated with alcohol to destroy any excess sodium present, followed by filtration and distillation of the filtrate.

The inert solvent must lack any ability to react with tetrafluoroethylene and must be dry to avoid decomposition of the alkali metal alcoholate. Although ether is quite satisfactory, it may be replaced by dioxane or hexane. Other solvents, of course, are operable as long as they meet the requirements of inertness and are liquid in form at room temperature. The boiling point of the solvent is not critical for at the temperature of reaction, the reaction mixture is in a sealed bomb.

The fluoro-olefin reagent used in the process is tetrafluoroethylene. The other reagent used is the alkali metal salt of an alcohol. The aliphatic alcohols which may be used are primary alcohols such as methyl, ethyl, n-propyl, n-butyl and undecanol-1. Fluorinated alkanols such as 2,2,2-trifluoroethyl alcohol may be used. Unsaturated alcohols such as 4-penten-1-ol may also be used. Sodium is the preferred alkali metal.

The products obtained by the process of this invention are liquids, their boiling point depending, mainly, upon their molecular weight. For example, methyl trifluorovinyl ether boils at 10.5–12.5° C. while propyl trifluorovinyl ether boils at 63° C. These compounds are soluble in the common organic solvents such as ether, dioxane and the like. These trifluorovinyl ethers are useful as monomers for conversion to polymers having a wide range of applications. The monomers of the present invention may be polymerized to high molecular weight solids having sufficient melt flow to make their fabrication by conventional techniques such as injection molding and melt extrusion possible. The polymeric alkyl trifluorovinyl ethers, for example, can be compression molded and injection molded into massive articles or melt extruded into tubing, film, and fibers. The trifluorovinyl ethers may also be dimerized, trimerized, and tetramerized to give interesting products. Of particular interest, because of their thermal stability, are the dimers of the alkyl trifluorovinyl ethers, which are saturated four carbon fluorinated ring compounds with two pendant alkoxy groups. These cyclic alkyl trifluorovinyl ether dimers are useful as heat stable fluids. The monomeric ethers of the present invention can be admixed with stabilizers, fillers, or pigments to improve certain characteristics of the polymer product resulting from the polymerization of said monomer.

Other fluorinated alkanols, which may be used in accordance with the present invention as the alkali metal salt, have the structure $R_f CH_2 OH$ wherein $R_f$ is $C_n F_{2n+1}$ with $n$ being an integer from 1 to 10, and $HC_n F_{2n}$ with $n$ being the integer 1 and even integers from 2 to 10. Representative examples are 2,2,2-trifluoroethyl alcohol, 2,2-difluoroethyl alcohol, 2,2,3,3,3-pentafluoropropanol, 2,2,3,3-tetrafluoropropanol, and 1,1,11-trihydroperfluoroundecan-1-ol.

Unsaturated primary alcohols may also be used in the form of their alkali metal salt; these alcohols may be from 3 to 11 carbon atoms in length. Representative examples are allyl alcohol, 3-buten-1-ol, 2-buten-1-ol, 4-penten-1-ol, propargyl alcohol (3-propyn-1-ol), and, 10-undecen-1-ol.

The alkali metal used to prepare the alkali metal salt according to the present invention may be sodium, potassium or lithium with sodium being the preferred alkali metal.

EXAMPLE 1

*Preparation of propyl trifluorovinyl ether*

A mixture of 27 g. (0.33 mole) of sodium n-propoxide, 53.1 g. of ether, 50 g. (0.5 mole) of tetrafluoroethylene and 0.5 g. of terpene polymerization inhibitor* is heated in a 400 ml. stainless steel bomb at 90° C. with agitation to produce a pressure drop from 315 p.s.i. to 230 p.s.i. The temperature is then slowly raised to 110° C. and maintained at that temperature until the pressure is constant. The bomb is cooled. Then the contents are added to water and neutralized with hydrochloric acid forming a two-phase liquid of ether and aqueous layer. The ether layer is separated and the aqueous layer is extracted with ether. The ether layers are combined, then dried and distilled on a 30-plate column to yield 4.5 g. of pure propyl trifluorovinyl ether which has a boiling point of 63° C.

EXAMPLE 2

*Preparation of butyl trifluorovinyl ether*

A mixture of 25 g. (0.26 mole) of sodium n-butoxide, 50 g. (0.5 mole) of tetrafluoroethylene, 85.0 g. of ether ---
* "Terpene B," a $C_{10}H_{16}$ hydrocarbon fraction consisting mostly of dipentene and terpinolene; B.P. 176–196° C.; $N_D^{20} = 1.470 - 1.478$; $d^{15.5} = 0.855 - 0.870$.

and 0.5 g. of "Terpene B" is heated in a 400 ml. stainless steel bomb at 80° C. with agitation for 12 hours. The bomb is cooled. Then the contents are added to water and neutralized with hydrochloric acid forming an aqueous and an ether layer. The ether layer is separated and dried. It is distilled and yields 16 g. of highly unsaturated liquid boiling in the range 90–95° C. and containing principally butyl trifluorovinyl ether. This liquid is dissolved in carbon bisulfide and bromine is added until decolorization no longer occurs. The solution is distilled yielding the dibromide of butyl trifluorovinyl ether, that is, butyl 1,2-dibromo-1,2,2-trifluoroethyl ether, which has a boiling point of 152° C.

EXAMPLE 3

*Preparation of 4-pentenyl trifluorovinyl ether*

The sodium alcoholate of 4-penten-1-ol is prepared by adding alternately sodium and the alcohol to liquid ammonia until the last trace of blue color disappears. The salt which is formed is dried in a vacuum oven at 55° C./0.5 mm. for 2 hours. In 106 g. of sodium dried ether is suspended 29.5 g. (0.27 mole) of the above-described sodium alcoholate. This mixture is charged into a 320 ml. stainless steel bomb. The bomb is sealed, pressured to 300 p.s.i. with tetrafluoroethylene and heated to 90–95° C. with agitation. The bomb is repressured with tetrafluoroethylene as is necessary to maintain a pressure of 300 p.s.i. The reaction is continued until no further decrease in pressure occurs. The reaction mixture is removed from the cooled reaction vessel and is filtered. The filtrate is distilled through a 12-inch Vigreux column to remove the ether solvent. The residue is distilled through a 12-inch spinning band column yielding 5.4 g. of 4-pentenyl trifluorovinyl ether boiling at 54–57° C./96 mm.

EXAMPLE 4

*Preperation of 2,2,2-trifluoroethyl trifluorovinyl ether*

Twenty-five grams (0.25 mole) of 2,2,2-trifluoroethyl alcohol is dissolved in 155 g. of sodium dried dioxane. An excess of the theoretical amount of sodium in the form of a 50% dispersion in xylene is added with stirring under nitrogen over a period of 3 hours. The mixture is allowed to stir for an additional 12 hours and then is charged into a 320 ml. stainless steel bomb. The bomb is sealed, pressured to 300 p.s.i. with tetrafluoroethylene, and heated to 100° C. with agitation. The bomb is repressured with tetrafluoroethylene as is necessary to maintain a pressure of 300 p.s.i. The reaction is continued until no further decrease in pressure occurs. The reaction mixture is removed from the cooled reaction vessel and is distilled through a 12-inch Vigreux column. Material weighing 24.7 g. and boiling in the range 42–95° C. is collected. This material is washed with three 50 ml. portions of ice water, is dried over anhydrous magnesium sufate, and is redistilled through a 12-inch spinning band column yielding 16.8 g. of 2,2,2-trifluoroethyl trifluorovinyl ether which boils at 40–41.5° C.

EXAMPLE 5

*Preperation of methyl trifluorovinyl ether*

A mixture of 33.3 g. (0.62 mole) of dry sodium methoxide and 155 g. of sodium-dried dioxane is placed in a 320 ml. stainless steel bomb. The bomb is sealed, pressured to 300 p.s.i. with tetrafluoroethylene, and heated to 100° C. under agitation. The bomb is repressured with tetrafluoroethylene as is necessary to maintain 300 p.s.i. of pressure. The reaction is continued until no further decrease in pressure occurs. The bomb is cooled and the exit gas is led into traps immersed in a Dry Ice acetone bath. The greater portion of the recovered material boils below −20° C. but the trap residue is combined with the contents of the bomb and the combined material is distilled through a 12-inch Vigreux column. Material weighing 30.7 g. and boiling in the range 21–45° C. is collected. This material is redistilled through a 3-foot low temperature column packed with glass helices. Nineteen grams of which boils at 10.5–12.5° C. is collected. This methyl trifluorovinyl ether product strongly reduces potassium permanganate solution and bromine.

I claim:

1. A process for the preparation of trifluorovinyl ethers having the structure $$R-O-CF=CF_2$$

wherein R is a radical taken from the group consisting of alkyl, fluoro-substituted alkyl and alkenyl radicals each of which contains a —$CH_2$— group adjacent to the oxygen atom, which process consists of reacting in an inert solvent, tetrafluoroethylene with an alkali metal alcoholate derived from alcohols of the structure R—OH wherein R is a radical taken from the group consisting of alkyl, fluoro-substituted alkyl and alkenyl in which the carbon atom attached to the oxygen has at least two hydrogens attached to said carbon atom, followed by eliminating the alkali metal fluoride.

2. A compound having the structure R—O—CF=$CF_2$ wherein R is a radical taken from the group consisting of alkyl, fluoro-substituted alkyl and alkenyl radicals each of which contains a —$CH_2$— group adjacent to the oxygen atom.

3. The compound methyl trifluorovinyl ether.

4. The compound 2,2,2-trifluoroethyl trifluorovinyl ether.

5. The compound 4-pentenyl trifluorovinyl ether.

6. The compound butyl trifluorovinyl ether.

7. The compound propyl trifluorovinyl ether.

References Cited in the file of this patent

UNITED STATES PATENTS

| | | |
|---|---|---|
| 2,409,274 | Hanford et al. | Oct. 15, 1946 |
| 2,671,799 | Miller | Mar. 9, 1954 |
| 2,784,175 | Ruh | Mar. 5, 1957 |
| 2,799,712 | Croix et al. | July 16, 1957 |

OTHER REFERENCES

Miller et al.: Jour. Amer. Chem. Soc., vol 70 (1948), pp. 431–32.

Webster's New International Dictionary, 2nd ed. (1950), unabridged 1194.

Corley et al.: Jour. Amer. Chem. Soc., vol 78 (1956), pp. 3489–3493.

UNITED STATES PATENT OFFICE
CERTIFICATE OF CORRECTION

Patent No. 2,917,548                          December 15, 1959

Stanley Dixon

It is hereby certified that error appears in the printed specification of the above numbered patent requiring correction and that the said Letters Patent should read as corrected below.

Column 6, line 16, list of references cited, under the heading "UNITED STATES PATENTS" for "Ruh" read -- Keel et al. --; under the same heading, add the following:

2,737,530    Ruh -- -- -- -- Mar. 6, 1956

Signed and sealed this 24th day of May 1960.

(SEAL)
Attest:

KARL H. AXLINE
Attesting Officer

ROBERT C. WATSON
Commissioner of Patents